United States Patent [19]
Jewell

[11] Patent Number: 6,077,165
[45] Date of Patent: Jun. 20, 2000

[54] FLEXIBLE COUPLING HAVING RE-ENTRANT CURVED COLUMNS FOR MAINTAINING HIGH TORSIONAL RIGIDITY DESPITE MISALIGNMENT

[76] Inventor: Hollis Jewell, 16785 Algonquin St., Huntington Beach, Calif. 92649

[21] Appl. No.: 08/911,636

[22] Filed: Aug. 15, 1997

Related U.S. Application Data

[60] Provisional application No. 60/024,026, Aug. 16, 1996.

[51] Int. Cl.[7] .................................................. F16D 3/52
[52] U.S. Cl. .................................................. 464/88
[58] Field of Search .................. 464/78, 79, 80, 464/88, 98, 99, 100, 101, 147

[56] References Cited

U.S. PATENT DOCUMENTS

| | | |
|---|---|---|
| 488,539 | 12/1892 | Claus ........................................ 464/79 |
| 1,045,791 | 11/1912 | Hodge ...................................... 464/79 |
| 1,943,942 | 1/1934 | Quintavalle .............................. 464/78 |
| 2,693,222 | 11/1954 | Krupp . |
| 3,233,428 | 2/1966 | Chalpin . |
| 3,301,007 | 1/1967 | Chalpin et al. . |
| 3,328,976 | 7/1967 | Shoemaker et al. . |
| 3,346,945 | 10/1967 | Chalpin et al. . |
| 3,473,349 | 10/1969 | Tateyama . |
| 3,677,031 | 7/1972 | Zierak et al. . |
| 4,084,409 | 4/1978 | Wolf et al. . |
| 4,175,405 | 11/1979 | Smith et al. . |
| 4,206,617 | 6/1980 | Nakamoto . |
| 4,317,339 | 3/1982 | Schmidt . |
| 4,332,404 | 6/1982 | Huffman . |
| 4,411,634 | 10/1983 | Hammelmann . |
| 4,488,738 | 12/1984 | Valdes . |
| 4,798,492 | 1/1989 | Smith . |
| 4,943,261 | 7/1990 | Smith . |
| 4,968,286 | 11/1990 | McGuire . |
| 5,000,722 | 3/1991 | Zilberman . |
| 5,041,060 | 8/1991 | Hendershot . |
| 5,066,263 | 11/1991 | Lunke et al. . |
| 5,158,504 | 10/1992 | Stocco . |
| 5,221,232 | 6/1993 | Nameny . |
| 5,387,157 | 2/1995 | Nameny . |
| 5,474,499 | 12/1995 | Olson . |

FOREIGN PATENT DOCUMENTS

| | | |
|---|---|---|
| 1030081 | 6/1953 | France . |
| 1525341 | 7/1969 | Germany . |
| 653446 | 3/1979 | Russian Federation . |
| 1295063 | 3/1987 | U.S.S.R. .................................. 464/92 |
| 2 091 843 | 8/1982 | United Kingdom . |

OTHER PUBLICATIONS

English translation of the abstract of Russian Federation Document 685,859, Sep. 1979.

*Primary Examiner*—Terry Lee Melius
*Assistant Examiner*—Greg Binda
*Attorney, Agent, or Firm*—Jones, Tullar & Cooper, P.C.

[57] ABSTRACT

For shafts that are nominally collinear and are to be coupled to rotate together while being subject to misalignments of different kinds, a flexible coupling is provided that includes curved reentrant columns circumferentially spaced about the axis of rotation and individually deformable by bending or twisting, or both. The composite result is that torque of a given loading is transferred uniformly from the driving to the driven member regardless of the misalignment effects, since different deformations are introduced and compensated in the columns, dependent on their instantaneous positions in the cycle of rotation. The arrangement enables meeting different load and misalignment requirements by varying the parameters of the columns, the manner in which they are coupled to the shafts, and the characteristics of the columns along their lengths. Furthermore, different combinations of the couplings can be used to achieve special results.

25 Claims, 8 Drawing Sheets

FLEXIBLE COUPLING HAVING RE-ENTRANT CURVED COLUMNS FOR MAINTAINING HIGH TORSIONAL RIGIDITY DESPITE MISALIGNMENT

CROSS-REFERENCE TO RELATED APPLICATIONS

This application claims the benefit under 35 U.S.C. §119 (e) of U.S. Provisional application Ser. No. 60/024,026, filed Aug. 16, 1996.

BACKGROUND OF THE INVENTION

1. Field of the Invention

This invention relates to devices for coupling rotating shafts together, and in particular, to a flexible shaft coupler device that compensates for various misalignments between drive and driven shafts.

2. Description of Related Art

Numerous flexible or elastic shaft couplings are in use for coupling drive and driven shafts in systems having rotating mechanical parts. A motor, for example, may have to be coupled to a gear box and for this application it is far superior in terms of compactness and economics to use a flexible shaft coupling rather than establish precise parallel alignment between the two shafts. In fact, many rotary systems have bearings and other support elements which are designed to accommodate movement about the axis of a shaft upon start-up or during operation. In addition, thermal expansion of components, system vibration, and other factors introduce misalignments that can best be taken up by flexible shaft couplings.

Flexible shaft couplings are also used where no substantial torsional load may be involved, but when one member, such as a rotary transducer or encoder, may be coupled to another member, such as a servo motor, to provide a precise indication of motor angular position. Not only must shaft misalignment be compensated for, but the amount of rotational displacement or "wind-up" must be essentially eliminated as a material error.

Shaft misalignments can take any one or all of several forms. There can be parallel misalignment, with the rotational axes of the shafts being parallel but not coaxial, and also angular misalignment, where the rotational axis of the shafts intersect (are not parallel). Angular misalignment can be in more than one plane. Most applications contain a combination of both parallel and angular misaligmuents, often referred to as skewed misalignment. In addition, as noted, the axial displacements between the shafts may also vary, statically or dynamically for different reasons.

Consequently, as the two coupled but somewhat misaligned shafts rotate, varying loads are exerted in cyclic fashion on the flexible shaft coupling. During each rotation, any given part of the coupling is subject to compression through one limited arc and later subject to expansion through another limited arc. These variations continually exist during rotation, and consequently, strength, modulus, wear and fatigue factors all must be accounted for in choosing the materials and dimensions for the elastic coupling.

The principal existing approaches, those identified here being by no means exclusive, to the design of elastic shaft couplings are based on the use of flexible diaphragms, transverse to the axes of rotation, flexible bellows concentric with the axes of rotation, and flexible sleeves concentric with the axes of rotation. The sleeves are made flexible by being divided into columns which can yield somewhat under the deflections involved. All three designs permit axial and torsional variations to be accommodated, but all three have specific limitations that relate not only to their performance, but the suitability of their configuration for use in practical installations.

The flexible shaft element must be coupled to the shafts, as by hubs with set screws, keyways, clamps, splines, tapered members, bonding or other means. The radial dimension of the coupling can usually be a substantial portion of the radial dimension of a drive or driven member, which is generally larger. Length, however, is often the most important consideration since it is generally desired to have the drive and driven elements close together.

The yieldable portion of the coupler must observe certain constraints, depending upon the design, and also must be configured so as to be compactly attachable by a hub or other means to the associated shaft portion. Elastic sleeves and bellows arrangements inherently require substantial length and also are limited in the number of parameters which can be adjusted to account for different conditions. Load carrying capability, misalignment capability, torsional deflection, fatigue resistance, economic constraints and other factors all vary with the circumstances, but in any event, the product should be easy to manufacture and easy to modify.

A precision flexible coupling can no longer be thought of as just a component to connect two misaligned shafts. It must be as precise in its performance as the servo motors, stepping motors, precision ground ball screws, rotary transducers, encoders and other like components used in the designs of today's machinery. The coupling must often have a high degree of torsional rigidity so that the components it is connecting will be as closely synchronized as possible. In elastic sleeves and bellows arrangements, however, torsional rigidity decreases and torsional deflection (wind-up) increases as a result of increasing misalignment. Thus, the need exists for an elastic coupler that can accommodate parallel and angular misalignment without a corresponding decrease in the torsional rigidity of the coupler.

SUMMARY OF THE INVENTION

To overcome the limitations in the prior art described above, and to overcome other limitations that will become apparent upon reading and understanding the present specification, the present invention discloses a flexible or elastic coupler with re-entrant curved columns deviating from one of two planes. In one form the plane is transverse to the axis of rotation and in the other the plane is concentric with the axis of rotation. In either form the elastic coupler connects two rotating bodies that can have some degree of parallel and/or angular misalignment.

The re-entrant curved columns are circumferentially and symmetrically spaced by gaps or separator slots about the rotational axis. The columns thus provide separately deformable elements which compensate for the different misalignments by bending or twisting, or both, depending on their position in the rotational cycle. The independent twisting deformation of each column in response to misalignment increases the torsional rigidity of the elastic coupler as a whole. Consequently, the greater the misalignment, the lower the amount of hysteresis or wind-up between the rotating bodies. By contrast, multi-convoluted bellows or multi-disc type couplings, as well as nearly all other flexible shaft couplings, decrease in resistance to angular displacement with increasing misalignment of the two shafts connected to the coupling.

The elastic coupler permits parallel and angular misalignment by deformation in three dimensions and torsionally within the columns. By coupling the opposite ends of the columns to rigid hubs or sleeves that are attached to the shafts, the bending and twisting deformations are confined to the columns. The number of columns, their width, thickness, length, modulus of elasticity and arc of curvature, and their radial position relative to the axis of rotation can thus be chosen to meet specific load and misalignment conditions.

As a more specific example, an elastic coupler with re-entrant curved columns extending from and back to a base in a plane transverse to the axis of rotation, may define a portion of a toroidal envelope, specifically an approximate half-torus. Misalignment deforms the curved columns of this toroidal segment differently at successive points in a rotational cycle. For example, angular and parallel misalignment cause some curved columns lying at that time within a limited arc to be compressed while those curved columns in another limited arc 180 degrees from the columns in compression undergo extension. Curved columns that lie intermediate of the columns in extension and compression are in various states of twist with one end of the curved column leading or lagging, i.e., being at a different rotational angle than the other end, depending upon their relative position in the rotational cycle.

Substantial variations in position between the drive and driven sides of the coupler are accepted because of the independent action of the individual curved columns. Segmenting of the toroidal body limits the hoop stresses generated and makes it possible to accommodate the misalignment without cracking.

Depending upon the mounting of the elastic coupling to the drive and driven shafts, axial shifting of the shafts may cause one end of the curved columns to move axially to absorb the deformation. Alternatively, the axial movement of the shaft may be absorbed entirely by the segmented toroid. This may occur where, for example, the elastic coupler is mounted directly to a flange attached to a drive or driven shaft.

Furthermore, the deformation of the re-entrant curved columns alleviates the problem of pre-loading the elastic coupler and the rotating shafts as well as absorbing forces (shock loads) that would otherwise be transmitted between the drive and driven shafts. The gaps or slots between curved columns need not be radial with respect to the axis of rotation, but may be angled or of varying width, or both. The gaps may be varied in shape to reduce the twisting action but increase the torsional stiffness without losing the axial motion capability.

The re-entrant curved columns can have a variety of arcuate shapes including semi-circular, elliptical and paraboloid. The columns can also have a variety of cross-sectional shapes as well as uniform rectangular, and can vary in cross-section along their lengths. Moreover, the curved columns may be arranged to define more than one approximate half torus segment. These toroidal segments may face in the same or opposite directions and may be of similar or dissimilar shapes and cross-sections. For other applications, more than one flexible coupling, spaced apart along the axis of rotation, may be employed.

Devices in accordance with the present invention can be used with a variety of hubs and shaft coupling devices. These couplers include but are not limited to those using set screws, set screw and keyway, "C" shaped integral clamp, tapered lock clamp, and split tapered threaded clamp. The configurations are such that the reentrant columnar elements can be formed integrally with annular bases that are attachable to hubs, or themselves for hubs for affixation to the shafts. The hubs may also, in accordance with the invention, incorporate deformation limiting surfaces that restrain misalignment.

Alternatively, the curved columns may be oriented so that they extend from and back to a base cylinder that is concentric about the axis of rotation. The curved columns may be oriented to form a convex torodial flexure or may be inverted to form a concave torodial flexure. The shape, cross section, angle and number of separator slots as well as the number of toroidal sections for the curved columns may be varied in the same manner as described for those columns oriented in a plane transverse to the axis of rotation. The deformation of the columns is similar to the deformation of columns curving axially from a plane transverse to the axis of rotation.

Devices in accordance with the present invention can be selected to meet the high tolerances for small angular deflections and high life expectancy by varying the hollow toroidal flexure's height, width, thickness, and diameter as well as the number of curved segments on each coupler. Devices can also be made of different materials to vary the modulus of elasticity. Furthermore, such devices can be manufactured by many means including but not limited to investment casting, plastic molding, metal stamping or hot stamping plastic sheets.

BRIEF DESCRIPTION OF THE DRAWINGS

For a better understanding of the invention, its advantages, and the objects obtained by its use, reference should be made to the accompanying description and, the drawings in which there is illustrated and described specific examples of an apparatus in accordance, with the invention.

DETAILED DESCRIPTION OF THE INVENTION

Figure 1:
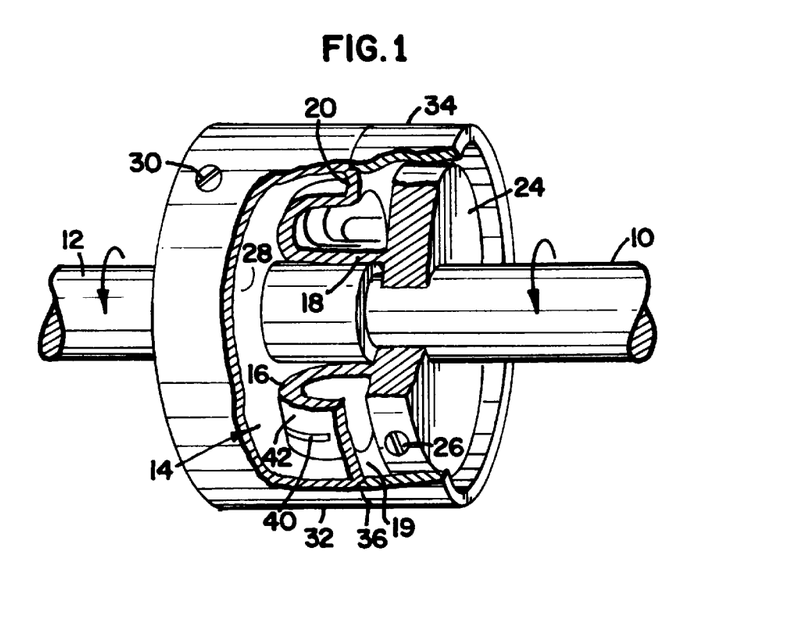
FIG. 1 is a perspective view, partially broken away, of an example of a flexible coupling device in accordance with the invention.
Figure 2:
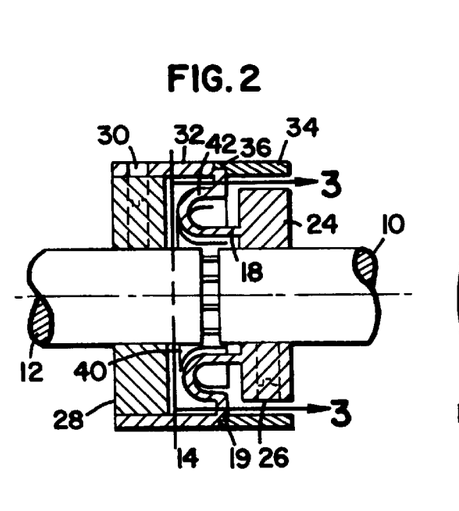
FIG. 2 is a side sectional view of the device of FIG. 1.
Figure 3:
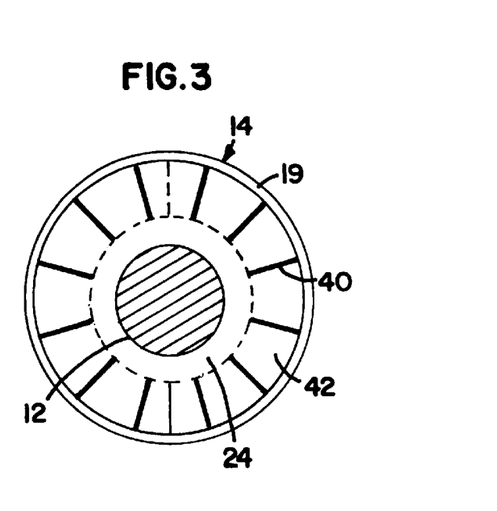
FIG. 3 is an end sectional view of the device of FIGS. 1 and 2, taken along the line 3—3 in FIG. 2.

Referring now to FIGS. 1–3, a device in accordance with the invention is for coupling a drive shaft 10 to a driven shaft 12 which is nominally on the same axis, and which is to be driven at the same rotational rate. A misalignment is not shown in FIGS. 1–3, but is depicted hereafter. The flexible coupling device 14, which may also be called a flexure, is disposed to couple the two shafts 10, 12. In this example its principal element comprises a half torus or ring 16 that is concentric about the nominal axis of rotation of the shafts 10, 12, and extends away from and then back to a reference plane that is transverse to the axis of rotation. The circumferential edges of the half torus 16 are completed by integral annular elements, which will effectively be rigid in most examples although they are typically of the same material as the half torus and integral therewith. Here these two interconnecting elements are a drive ring portion 18 that is an extension of one side of the torus and forms a segment of a cylinder about the axis of rotation, and a driven ring 19 which is an extension of the other side of the half torus 16 and extends radially outwardly for a short distance to the associated mounting structure. The drive ring portion 18 couples to an inner circumference of a drive hub 24 which is affixed to the drive shaft 10 by one or more set screws 26. A driven hub 28 affixed to the driven shaft 12 by one or more set screws 30 is spaced apart from the drive hub 24, and includes a cylindrical sleeve 32 at its periphery, the sleeve 32 extending in the direction toward the drive shaft 10. A cylindrical shell 34 coupled to the end of the sleeve 32 encompasses the drive hub 24, being joined to the sleeve 32 by an offset shoulders 36. The gap between the drive hub 24 and the shell 34 is used to define an acceptable deflection limit between the shafts 10, 12.

Referring to FIGS. 1 and 3 particularly, the flexible coupling is incrementally divided by radial separator slots 40 through at least the upper portion of the half torus 16, the slots therefore subdividing the torus into partially separate reentrant columns or arms 42, best seen in FIGS. 1 and 3. This configuration, as will be seen in more detail below, provides a number of available types of deformation within the flexure 14, for use in responding to the different types of misaliguments that may be encountered. The reentrant columns 42 can deform axially, to accommodate tolerance variations in the spacing between the drive and driven shafts. The curvature of the columns can also vary with cyclic position in compensating for different forms and directions of misalignment of the shafts. Moreover, the reentrant columns 42 are capable of independent torsional adjustment as a further form of deformation. When the deformation between the sides of the half torus induces a torsional deformation of the columns, the device uniquely resists windup or angular distortion or hysteresis between the drive and driven shafts.

Figure 4:
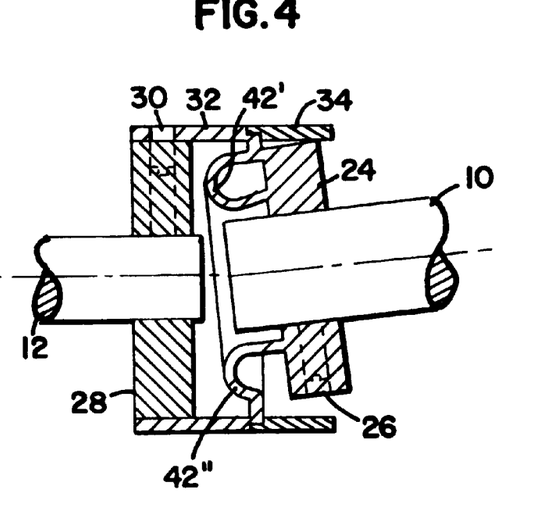
FIG. 4 is a simplified side view of a central portion of the device of FIG. 1–3, illustrating deformation of the flexible coupler under a condition of angular misalignment.
Figure 5:
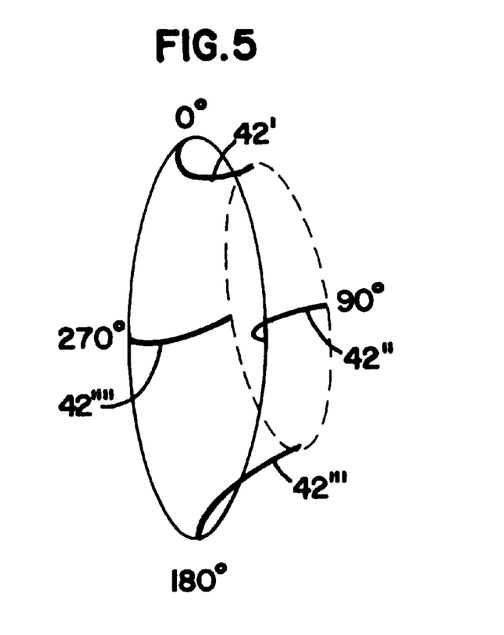
FIG. 5 is a diagrammatic and exaggerated view of different deformations of a flexible coupling element of FIG. 4, showing how a single columnar element is deformed at different quadrant positions.

These features are exemplified by the side sectional view of FIG. 4, and the diagrammatic view of FIG. 5, which depict a simple angular misalignment condition for the example of FIGS. 1–3, in which the misalignment (shown at a greater angle for purposes of clarity then will typically be encountered) may be called a simple angular misalignment. That is, the angular misalignment is such that the shafts rotate about axes of rotation which have a slight angle between them but lie in the same plane. As seen in FIG. 4, such a misalignment tends to contract one reentrant column 42' and at the opposite side expands the other reentrant column 42". However, as seen in FIG. 5, which is diagrammatic only for purposes of illustration, and significantly exaggerated, the reentrant columns distort in different ways in cyclic fashion during rotation. The example assumes that supporting rings which are fixedly coupled to their respective hubs have limited flexibility, since this does not alter the fundamental operation, and restricts deformation essentially to the columns 42. With angular misalignment in this configuration, the points of attachment of the individual columns at their outer ends are shown as lying along a circular solid outer line, and the opposite ends of the columns are attached at points along a skewed circumference of rotation, shown as a dotted line. These circles define gaps between which the columns 42 provide bendable and twistable individual couplings. Referring therefore to FIG. 5, exemplications of the columns 42 are shown as thin elements at positions of 0°, 90°, 180° and 270° respectively, because it is easier to visualize the deformation forces acting on the columns. At 0° the column 42' is in the same plane at both ends, but the upper end of the inner circumference is closer to the outer circumference, so that the column 42' is somewhat compressed. This is most particularly evident by comparing it to the column at the 180° position, number 42''', which is also in planar alignment with the other point of attachment but must cover a longer span of displacement, so that it is stretched outwardly. In between, at the 90° position (column 42'') and the 270° position (column 42'''') the columns have returned to the median gap position, but the angular displacement due to the slanted plane of the inner circumference relative to the outer plane of the outer circumference, and the misalignment relative to the plane of the common axis of rotation induces torsion in the columns 42'', and 42'''', and these are of opposite sense. Rotational torque which acts on the columns 42 is not depicted, but is essentially about the circumference, and thus tends to introduce twisting in the hoop direction.

It will be appreciated that the widths and lengths of the columns, the type of material used (and its modulus of elasticity), and the radial or equivalent dimension of the torus, and its displacement from the nominal axis, can be selected to optimize the flexure 14 for a given installation, ranging from a small servo motor coupling to a large industrial power drive.

The operative parameters to be met include the load capacity that will be imposed, the amount and types of misalignments to be encountered, and the torsional rigidity limits (windup) that can be tolerated. Since the curved columns or arms respond to loading by bending or twisting or both, the flexural modulus of the material, the material thickness (t), the number of columns (n), the radius of the arms (r) and their radial location (R) are factors to consider. The response of the flexure to axial offset only is by arm bending only, whereas the response to torsional offset only is by twisting only. The twisting response introduces an important advantage of the concept, since twisted arms are stiffer because of this deformation, and the torsional rigidity of the flexure increases, counteracting windup tendencies. Because the twisting enhances rigidity of the columns acts cumulatively, the restoring force against windup is maximized, a property which is not known to have been heretofore achieved in the prior art. In addition, it should be recognized that hoop stress, which can induce cracking under high torsional loads, is minimized by the spaces present between the separate columns.

The response to both angular offset and parallel misalignment conditions is a combination of both bending and twisting of the columns. Design analysis shows that axial stiffness (I) and torsional stiffness (J) both vary non-linearly with material thickness, in accordance with $$I = \frac{W \times t^3}{12}$$

$$J = \frac{t \times W^3}{12} + \frac{W \times t^3}{12}.$$

Consequently, using both equations, the approximate load versus deflection characteristics of the coupling can be determined and controlled, within a given range, using arm thickness alone as a variable. This has useful implications for facilitating product design where size and attachment factors are largely predetermined.

Figure 6:
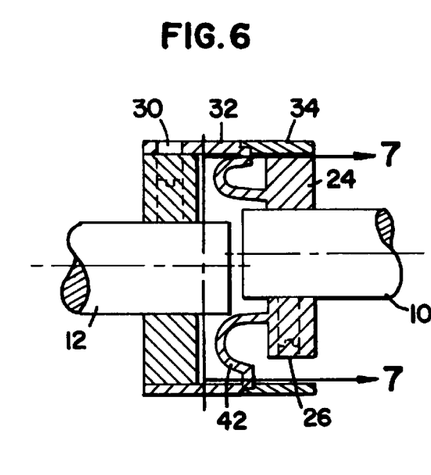
FIG. 6 is a simplified side view of the device of FIGS. 1–3 illustrating deformation of the flexible coupling under a condition of parallel misalignment.
Figure 7:
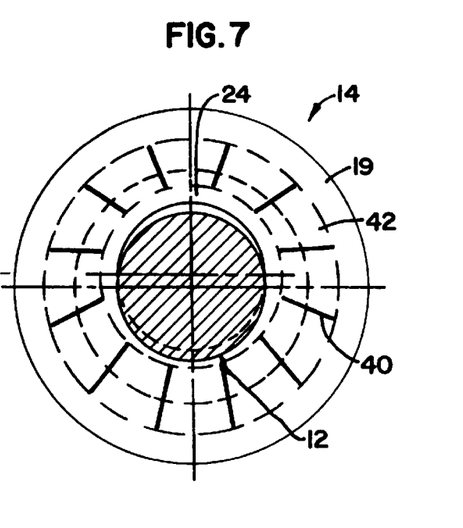
FIG. 7 is an end sectional view of a portion of the flexible coupling device of FIGS. 1–6, taken along the line 7—7 in FIG. 6 showing the deformation of the coupling under the selected conditions.
Figure 8:
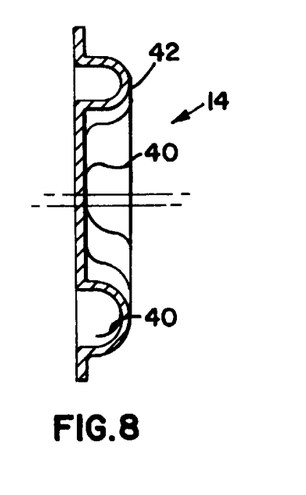
FIG. 8 is a simplified side sectional view of a portion of the flexible coupling device in the condition of FIG. 6, showing the deformation of columnar elements in somewhat exaggerated form.
Figure 9:
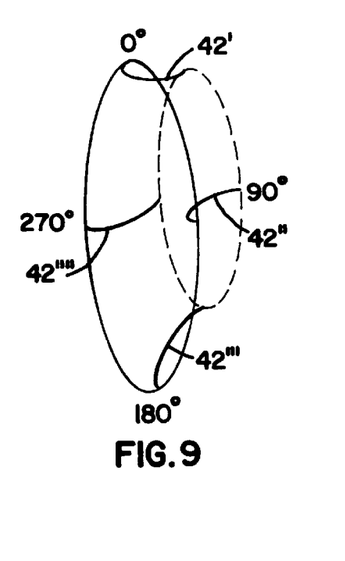
FIG. 9 is a diagrammatic and exaggerated view of the deformed flexible coupling of FIG. 6 showing how different columnar portions deform at different quadrant positions in the condition of parallel misalignment.

A different form of misalignment, simple parallel misalignment, is depicted in FIGS. 6–9, for the same basic configuration of device. The drive shaft 10 here is displaced above the nominal axis, the axis of the driven shaft 12, as shown in FIGS. 6 and 7. Consequently, as seen in FIG. 7 there is a vertical deformation in the body 14 during flexure, this being taken up in the approximate half torus 16, by torsion of the reentrant columns 42, as seen in FIGS. 7 and 8. This is also depicted in FIG. 9 in diagrammatic form, where the contrast in effect on the columns with circumferential position is seen more clearly.

Figure 10:
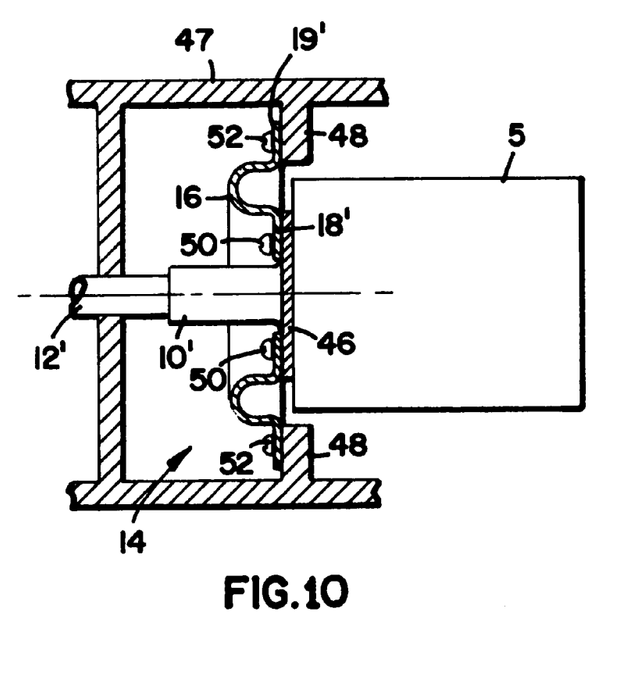
FIG. 10 is a side view, partly in section, of a different example of a flexible coupling device in accordance with the invention showing a different mounting arrangement for associated driving and driven devices.
Figure 11:
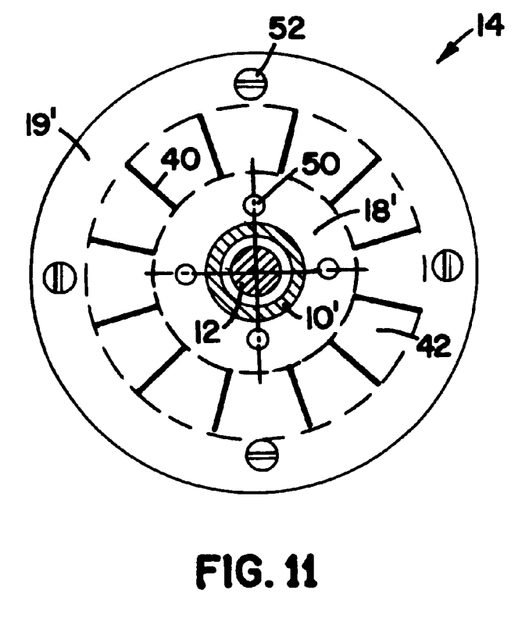
FIG. 11 is an end view of the flexible coupling employed in the device of FIG. 10.

A second example of a flexible coupling and mounting means attached to associated drive and driven devices is depicted in FIGS. 10–11. In this version, which is particularly useful for limiting azimuthal deflection (windup), the flexure 14 couples a hollow shaft 10' affixed to an adjacent servo motor or encoder to a concentric nested interior shaft 12' on the same axis that is mounted on the back of a motor or some other machine. In this example, depending on whether the servo motor or encoder is coupled to the hollow shaft 10', either shaft can be the driver. However, the primary need here is to eliminate windup. The hollow drive shaft 10' turns a hub disk 46, while the interior shaft 12' is mounted to be turned by or turn with a frame 47 having an inner flange 48. The flexure 14 is disposed in a plane normal to the nominal rotational axis and coupled between the inner hub disk 46 and the inner flange 48 on the frame 47. An inner drive ring portion 18' of the half torus 16 in the flexure 14 is attached by cap screws 50 to the hub disk 46 attached to the hollow shaft 10'. The outer ring portion 19' of the flexure 14 is attached by cap screws 52 to the inner flange 48 of the frame structure 47 connected to the interior shaft 12'. This mounting requires no hubs, and with the columns of the flexure being at a larger diameter, provides for a more rigid torsional coupling resulting in less windup. The widths of the columns 42 (FIG. 11) can be selected to further enhance torsional rigidity. In addition, the flexure 14 is readily fabricated as a single piece needing only set screws to affix to the spaced apart annular driving and driven mounts. It can be seen that the interior shaft 12' will maintain angular alignment with the rotational position of the hollow shaft 10' when it is turned, as by servo motor 54.

Another advantage of this arrangement is that it supplants, as for encoder and other applications, the flat sheet metal brackets now widely employed. These become resonant at different frequencies and amplify resonances introduced by other machinery. Using synthetic resins and other materials with different modulus properties, and varying the number and other parameters of the columns, the device can achieve a resonant-free condition throughout its operating range.

Figure 12:
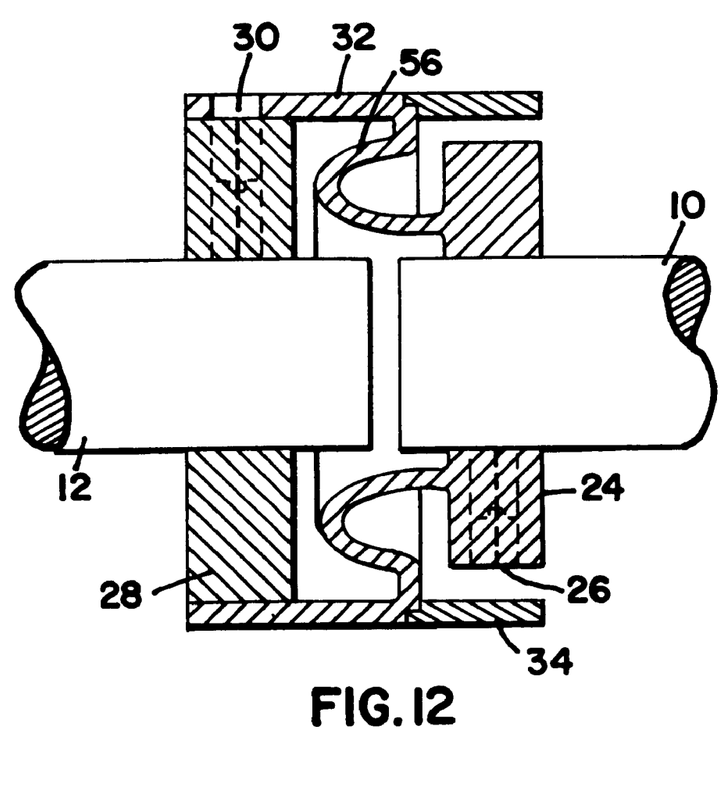
FIG. 12 is a side simplified view of an alternative reentrant column structure having an approximately parabolic curvature.
Figure 13:
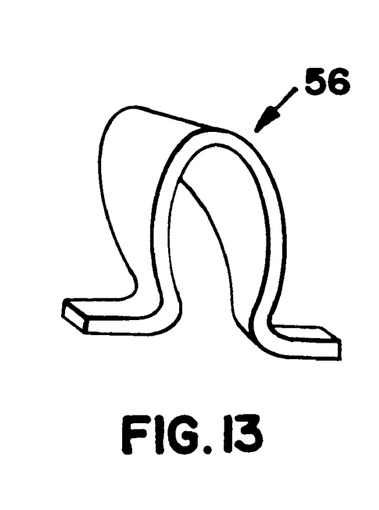
FIG. 13 is a fragmentary perspective view of a columnar shape having the approximately parabolic curvature that may be employed in the flexible coupling of FIG. 12.

An alternative shape for the individual columns may be paraboloidal as illustrated in FIGS. 12–13. A column 56 can thus have a curvature along its length that is varied to meet the amount of resistance to misalignment and torsion required in a particular application. Generally speaking, the smaller the radius of curvature at the apex of the curve in relation to length of the column, the lower the reactive force to bending. Alternative shapes include but are not limited to elliptical, semi-circular and paraboloidal elements in which the dimensions of a particular reentrant column 42 are optimized by variation along the axis (column length) and radially (column width) to meet specific requirements.

Figure 14:
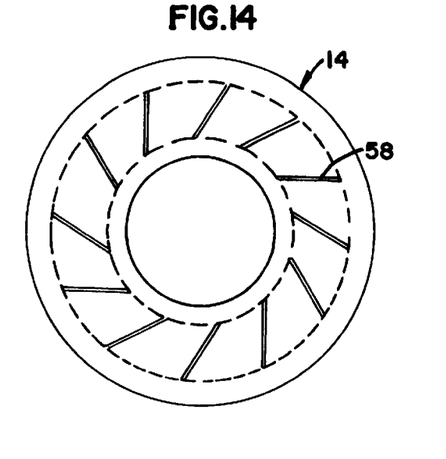
FIG. 14 is a end view of yet another flexible coupling columnar variant illustrating separator slots that are non-radial in angle relative to the nominal axis.
Figure 15:
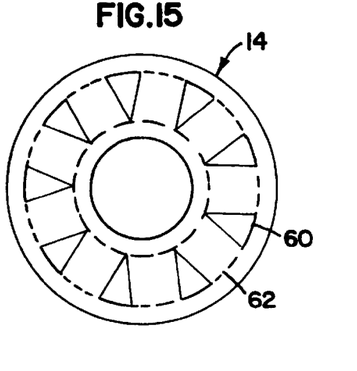
FIG. 15 is a end view of yet another flexible coupling columnar variant illustrating wedge shaped separator slots forming rectangular reentrant curved columns.

Additional variants of column shapes for these flexible couplings are depicted in FIGS. 14 and 15. FIG. 14 shows an end view of a flexible coupling 14 wherein the separator slots 58 are cut at a bias, i.e., the slots are angled relative to true radii from the axis of rotation. This increases the torsional rigidity of the flexible coupling 14 while still allowing for deformation in three dimensions. It will be recognized by those skilled in the art that the angle of the separator slots 58 can be changed to accommodate varying degrees of resistance to deformation and torsional rigidity required for a given application.

FIG. 15 depicts an end view of a flexible coupling 14 wherein the separator slots 60 are cut to form wedge shaped separator openings creating rectangular columnar elements 62 of the same size and shape. The wedge shaped separator slots 60 allow greater deformation to accommodate larger misalignment of the driving and driven elements while still maintaining an acceptable level of torsional rigidity.

Figure 16:
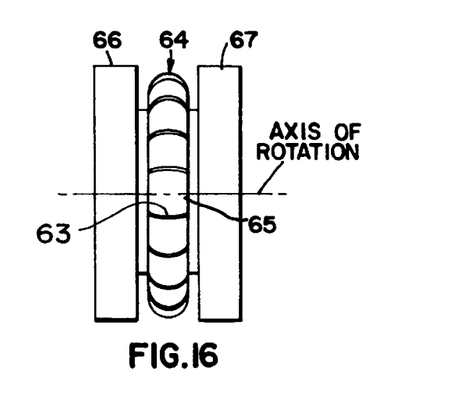
FIG. 16 is a side view of a segmented torodial flexure in which re-entrant columnar segments are curved outwardly with respect to a cylindrical shape concentric with the axis of rotation.
Figure 17:
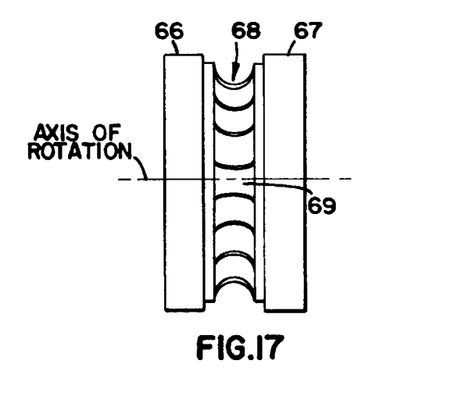
FIG. 17 is a side view of a different segmented torodial flexure in which the curvature of the columnar segments relative to a cylinder concentric with the axis are inverse to a shown in FIG. 16.

In the examples given thus far, the curved columns have deviated out from and back to a plane transverse to the nominal axis of rotation. However, as shown in FIGS. 16 and 17, the curvatures can be with respect to a cylindrical shell concentric with the nominal axis, shown by dotted lines. A side view is shown in FIG. 16 of a segmented torodial flexure 64 in which the re-entrant columnar segments 65 curve convexly relative to a cylindrical shape concentric with the axis of rotation. The separator slots 63 lie in planes circumferentially spaced and angled relative to the axis of rotation to permit both bending and flexure of the columns 65. End hubs 66, 67, which may be formed integrally with the columns 65, are shown only generally but may attach directly to the shafts, or to elements mounted on the shafts.

In FIG. 17, the flexure 68 also comprises columns 69 that curve along their lengths to change radial spacing relative to the axis of rotation. Here, however, the generally toroidal shape is concave rather than convex. In both examples, the flexures 64, 68 allow deformation in three dimensions while responding to load forces and providing resistance to angular windup. Orientation of the columnar shapes so that they vary from a cylinder concentric with the axis of rotation yields the same benefits as columnar elements curving along the nominal axis of rotation from a plane transverse to the axis of rotation. However, the configurations of FIGS. 16 and 17 can often be accommodated in a radially smaller space than other shapes.

Figure 18:
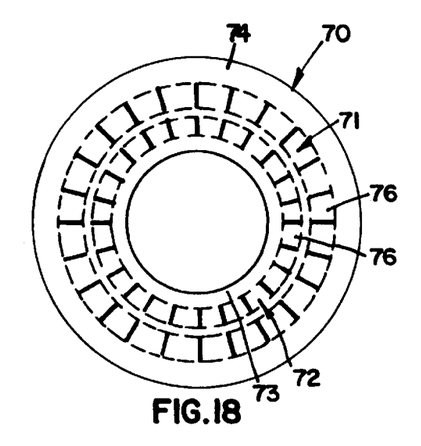
FIG. 18 is an end view of a flexure employing more than one concentric approximately half torus couplers.
Figure 19:
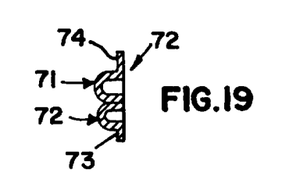
FIG. 19 is a side fragmentary view of a portion of the concentric half torus components of FIG. 18.

An end view of a flexible coupling 70 employing more than one flexure region is shown in FIGS. 18, and 19. The coupling element 70 contains two rings of concentric approximate half torus regions 71, 72 spaced circumferentially about the axis, and bounded by inner and outer annuli 73, 74 respectively which allow external couplings to be made. The columnar elements 76 extend from and return to the same plane, transverse to the axis of rotation. Additional approximately half toroidal rings can be used to increase the radial length while decreasing the axial length of the coupler for specific requirements, while maintaining the same amount of deformation and torsional rigidity.

Figure 20:
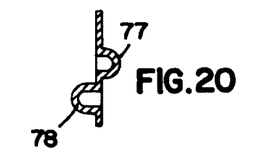
FIG. 20 is a side fragmentary view of a flexure having concentric half torus components of opposite polarity.

As shown in FIG. 20, in a different variant, concentric half torus rings 77, 78 may alternatively curve in opposite directions from a common transverse plane. Extending the half torus rings 77, 78 in opposite directions increases the torsional rigidity of the coupling in both clockwise and counter-clockwise directions while still allowing for deformation in three dimensions.

Figure 21:
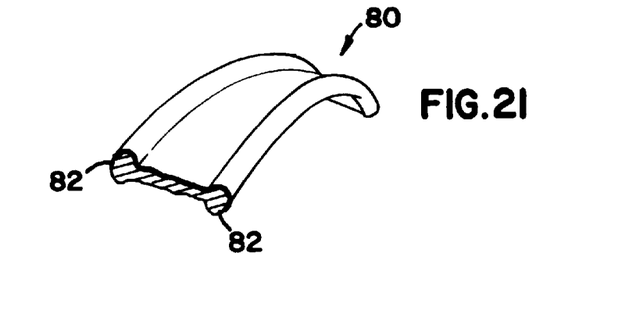
FIG. 21 is a perspective fragmentary view of a portion of a columnar element of non-uniform cross section having enlarged edges.

A perspective fragmentary view of a first columnar element 80 of non-uniform cross-section is shown in FIG. 21. The thickness of the columnar elements 80 is enlarged at the edges to form side beads 82, providing a dog-bone shaped cross section. A non-uniform cross section of this type minimizes stress risers that may otherwise exist at the end bases of a reentrant column 80. This increases the strength of the beam in a manner similar to an "I" beam, reducing the inertia of the coupling without increasing weight.

Figure 22:
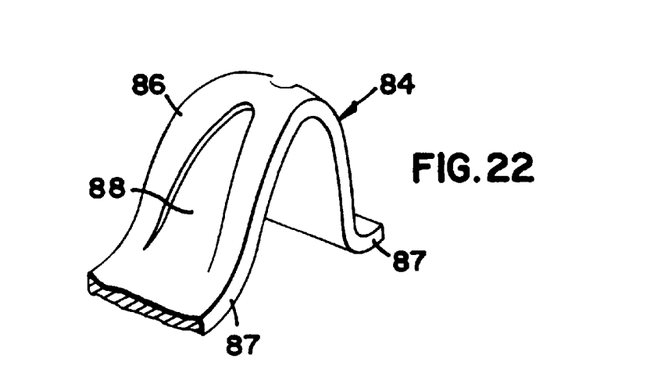
FIG. 22 is a perspective fragmentary view of a second columnar element of non-uniform cross-section providing an "X" shape.

FIG. 22 is a perspective fragmentary view of a second columnar element 84 of non-uniform cross-section. The column 84 has a varying thickness at different positions along its length. Thicker edges 86 of increasing width meet at the apex of the curve, to provide beams lying roughly in the shape of an "X". The crossing point of the "X" shape corresponds to the top of the curved column or arm 84, while the ends of the "X" merge into the base 87 at each end. The thinner, approximately triangular webs 88 between the edges 86 provide flexibility for bending while the edges 86 provide greater torsional rigidity and resistance to hoop stress. The thinner webs 88 may be eliminated entirely in some applications.

Figure 23:
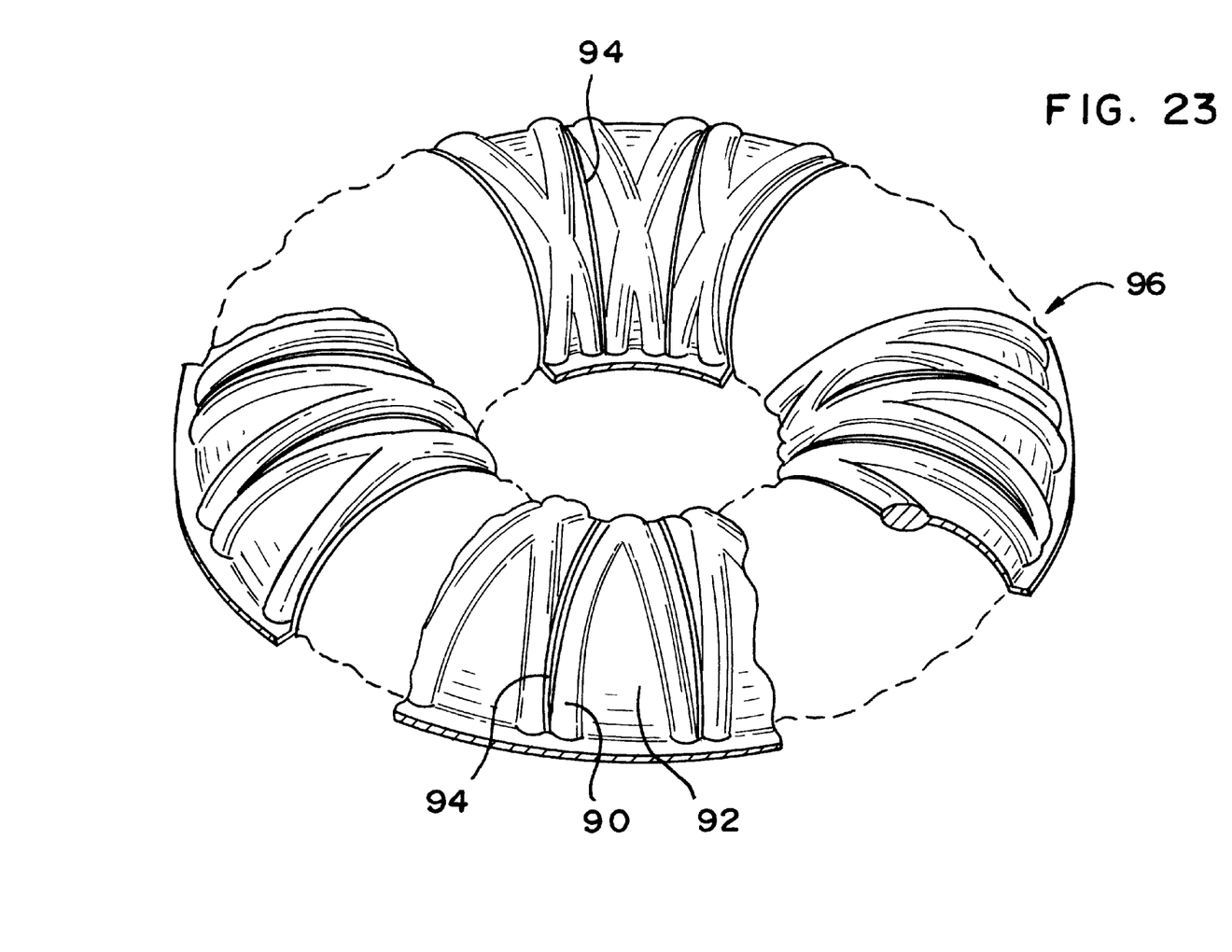
FIG. 23 is a perspective view, partially diagrammatic of a different form of torodial coupler element in accordance with the invention that incorporates columnar segments that vary in both cross-sectional shape and along their lengths.

The variants possible in cross-sectional shape of the curved columns are well illustrated by the example of FIG. 23, in which ribs 90 crossing in an "X" pattern along each column 92 are defined on both the inside and outside of the columns, and the columns 92 remain separated by slots 94 to provide a half torus 96. This structure can be readily investment cast in metal or molded in plastic, and is preferably but not necessarily an integral body. It can be seen that, in addition to selection of the dimensions of the torus 96, the number and spacing of the columns 92, as well as the materials used, there can be adjustment of the cross sectional size and shape of the ribs 90, and their crossing point as well.

Figure 24:
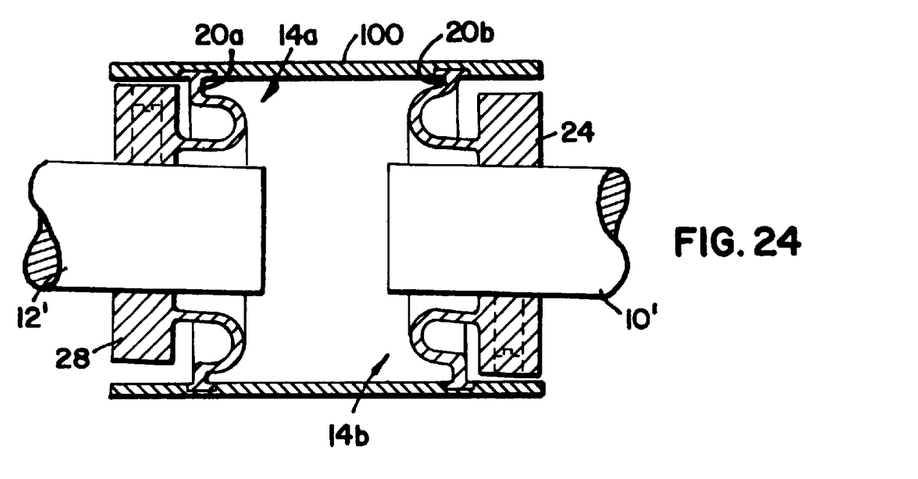
FIG. 24 is a side sectional view of a device using more than one flexible coupler, axially separated along the nominal axis of rotation.

More than one flexure device in accordance with the invention can be used to provide a flexible coupling having unique advantages or properties for particular applications. As seen in FIG. 24, two flexures 14a and 14b may be separately coupled to the respective shafts 10a, 12a at their inner mounts 24a, 24b, respectively. At their radially outer annuli 20a, 20b, they are attached to an interconnecting cylindrical sleeve 100 which is concentric with the axis of rotation. Thus both flexures 14a, 14b are responsive to deformations introduced by parallel and axial alignment. Since each flexure 14a, 14b contributes approximately half of the needed compensation the device can be used where the misalignments are substantial. The shaft 10', 12' ends, shown separated to a degree, can be brought together closely if desired, leaving only a gap sufficient to avoid interference.

Using finite element analysis or other detailed stress analysis techniques the design can be adjusted to optimize windup, misalignment, lifetime and other characteristics. Some alternatives for accomplishing the same objectives include varying the length of the separator slots, i.e., the depth of the cut, to create columnar elements of various lengths. The different lengths thus yield columns having different degrees of resistance to deformation and torsional rigidity. Moreover, the base of each column can be cut to form a radius to relieve stress risers that might arise in a particular application.

It will be recognized that the flexible coupling can be constructed of a variety of materials including, but not limited to synthetics such as Delrin™, Dupont engineering resin in the nylon family, or solid or fiber reinforced synthetics. Furthermore, additional materials include metals, particularly those which can be investment cast, pressed or stamped into curved shapes.

The flexible coupling can be coupled to drive and driven shafts in any number of ways well known in the art. These include set screws, set screws and keyway, C shared integral clamp, tapered lock clamp, split tapered threaded clamp, hubs, hub/flange combinations, direct mounting to the rotating body, and hub/tubular members to name a few.

In accordance with the present invention, the method of manufacture can be varied from, but not limited to, investment casting, plastic molding, stamping metals or hot stamping plastic sheets.

The invention disclosed overcomes the drawback in existing flexible couplings of loss of torsional rigidity and consequently increased windup that has heretofore resulted from increased parallel and angular misalignment. The present invention allows deformation in three dimensions as well as independent torsional adjustment in response to misalignment of drive and driven shafts. Furthermore, by allowing each reentrant curved column to expand, compress and/or twist independent of each other, the flexible coupling remains sufficiently rigid in torsion for applications requiring a high degree of rotational synchronicity between the drive and driven shafts.

The foregoing description of various aspects and features of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An elastic coupling for interconnecting a driving rotating body and a driven rotating body, said driving and driven rotating bodies being nominally disposed along the same axis of rotation and subject to misalignment, said elastic coupling comprising:
  a driving member;
  a driven member, said driving and driven members being spaced apart from each other, and being adapted to be coupled to the driving and driven bodies respectively; and
  an intermediate ring segment, said intermediate ring segment comprising a plurality of reentrant curved columns each column, coupled to said driving and driven members at opposite ends of each respective column and being substantially oriented in the direction of the axis of rotation, said columns being circumferentially spaced and separated from each other about the axis of rotation by a plurality of circumferentially spaced, radially directed gaps in said intermediate ring segment, adjacent ones of said gaps defining each of said reentrant curved columns, and each said column having an apex and being curved along its length, the length and cross-section of each column being dimensioned such that each column individually deforms in accordance with each column's rotational position by twisting torsionally inward and outward with respect to the driving and driven members about each column's apex between its ends when torque is applied by the driving rotating body, said columns limiting windup between the driving and driven bodies by absorbing circumferential and radial stresses introduced by torque and misalignment of the driving and driven rotating bodies.

2. The elastic coupling of claim 1 above wherein the rotating bodies are nominally collinear shafts and wherein the elastic coupling further includes a pair of hubs forming the driving and driven members, each coupled to a different shaft and coupled to an end of the intermediate ring segment.

3. The elastic coupling of claim 1 above, wherein the columns taken together form the general shape of a half torus.

4. The elastic coupling of claim 3 above, wherein the half torus deviates in curvature from a plane transverse to the axis of rotation.

5. The elastic coupling of claim 3 above, wherein the half torus deviates in curvature relative to the nominal axis.

6. The elastic coupling of claim 1 above, wherein the driving member and driven member are rigid relative to the columns such that deflections due to misalignment are taken up in bending and twisting of the columns.

7. The elastic coupling of claim 6 above, wherein the columns are integral at each end at least with the part of the driving and driven members to which they attach.

8. An elastic coupling as set forth in claim 1 above, wherein the intermediate ring segment comprises a unitary element and the columns in the intermediate ring segment are deformable both axially relative to the axis by bending and circumferentially about their lengths by twisting.

9. An elastic coupling as set forth in claim 8 above, wherein the driving member and the driven member comprise annuli at each end of the columns.

10. An elastic coupling as set forth in claim 8 above, wherein the columns are configured to respond to deformation individually by independently bending and twisting dependent upon circumferential position during rotation in accordance with the offsets and misalignments between the rotating bodies.

11. An elastic coupling as set forth in claim 1 above, wherein the thickness, modulus and dimensions of the columns of the intermediate ring segment are chosen to meet predetermined load and misalignment conditions of the rotating bodies.

12. An elastic coupling as set forth in claim 1 above, wherein the rotating bodies are driving and driven shafts and further comprising a cylindrical hub assembly coupling the drive and driven shafts,
  the cylindrical hub assembly including a cylindrical hub connected to one of the rotating bodies at a region interior of the intermediate ring segment of the elastic coupling; and
  the cylindrical hub assembly including a tubular shield at a region exterior of the intermediate ring segment of the elastic coupling, the tubular shield extending over the elastic coupling and the cylindrical hub such that the space between the inside diameter of the tubular shield and the outside diameter of the cylindrical hub approximates a distance corresponding to the maximum parallel and angular displacement rating of the elastic coupling.

13. An elastic coupling as set forth in claim 1 above, wherein the columns are uniform in width and the spacings vary in width with radial position.

14. An elastic coupling as set forth in claim 1 above, wherein the columns curve along their length in substantially a parabolic manner, providing an increased length for the twisting of the columns.

15. An elastic coupling as set forth in claim 1 above, wherein the intermediate ring segment lies in a concentric half torus about the nominal axis and the curvature of the columns varies radially with respect to the axis.

16. An elastic coupling as set forth in claim 15 above, wherein the apex of the half torus is at a maximum radius from the axis.

17. An elastic coupling as set forth in claim 15 above, wherein the apex of the half torus is at a minimum radial position from the axis.

18. An elastic coupling as set forth in claim 1 above, wherein the intermediate ring segment contains at least two intermediate concentric half torus segments at different radial regions.

19. An elastic coupling as set forth in claim 18 above, wherein the columns of both half torus segments face in the same direction.

20. An elastic coupling as set forth in claim 18 above, wherein the columns of the half torus segments face in opposite directions.

21. An elastic coupling as set forth in claim 18 above, wherein the coupling comprises at least two intermediate ring segments, each coupled at one side to a different one of the rotating bodies, and an element about the axis of rotation interconnecting the intermediate ring segments at the other side from the rotating bodies.

22. An elastic coupling as set forth in claim 1 above, wherein the columns vary in cross-sectional dimension along their lengths.

23. An elastic coupling as set forth in claim 22 above, wherein the columns include lengthwise ribs.

24. An elastic coupling as set forth in claim 1 above, wherein the bending and twisting characteristics of the individual columns are selected by varying the length, width, thickness, arc of curvature, cross-sectional area, modulus of elasticity of the material of the columns, and the radial spacing of the columns from the axis.

25. An elastic coupling as set forth in claim 1 above, wherein the columns are of constant cross section along their lengths, and the width (W) and thickness (t) of the individual columns are chosen to provide an axial stiffness determined by the moment of inertia (I) in bending in accordance with $$I = \frac{W \times t^3}{12}$$

and the column torsional stiffness (J) is determined by $$J = \frac{t \times W^3}{12} + \frac{W \times t^3}{12}.$$

* * * * *